United States Patent [19]

MacKenzie, Jr.

[11] 3,960,739
[45] June 1, 1976

[54] METHOD OF STABILIZING THE DIELECTRIC STRENGTH OF POLYOLEFIN POLYMERS, AND THE STABILIZED COMPOSITIONS AND PRODUCTS THEREOF

[75] Inventor: Burton Thornley MacKenzie, Jr., Monroe, Conn.

[73] Assignee: General Electric Company, New York, N.Y.

[22] Filed: June 21, 1973

[21] Appl. No.: 372,083

[52] U.S. Cl. ............................. 252/63.2; 252/63.5; 252/66
[51] Int. Cl.² ...................... H01B 3/00; H01B 3/02; H01B 3/24
[58] Field of Search ................... 252/63.2, 63.5, 66; 260/45.75 R, 94.9 GD

[56] References Cited
UNITED STATES PATENTS

| | | |
|---|---|---|
| 2,888,424 | 5/1959 | Precopio et al. .................... 252/63.2 |
| 3,148,169 | 9/1964 | Martens et al. ..................... 252/63.2 |
| 3,553,348 | 1/1971 | Betts ................................ 252/63.2 |

OTHER PUBLICATIONS

"The Stabilization of Vinyl Resins," Vertie H. Smith, *British Plastics*, 25, pp. 304–307, Sept. 1952.

Primary Examiner—Benjamin R. Padgett
Assistant Examiner—Josephine Lloyd
Attorney, Agent, or Firm—R. G. Simkins; P. L. Schlamp; F. L. Neuhauser

[57] ABSTRACT

A method of stabilizing the dielectric strength of polyolefin polymeric compositions when exposed to water, and dielectric stabilized polyolefin polymer compositions and products thereof including electrical insulations and insulated conductors. The polyolefin polymeric compositions are stabilized by the inclusion of a lead stearate compound.

21 Claims, 1 Drawing Figure

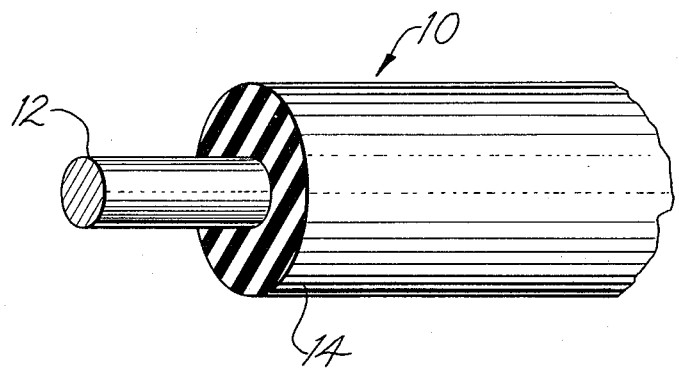

METHOD OF STABILIZING THE DIELECTRIC STRENGTH OF POLYOLEFIN POLYMERS, AND THE STABILIZED COMPOSITIONS AND PRODUCTS THEREOF

BACKGROUND OF THE INVENTION

Dielectric polymeric compositions, as is typical of most dielectric or electrical insulating materials, undergo significant reductions or losses in their dielectric strength, or insulating resistance, when subjected to wet conditions and an AC electrical stress. The decline of dielectric strength in such polymer compositions due to exposure to water and AC stress can be as much as 40 to 60% of their initial values. This general loss of dielectric strength for common insulating materials constitutes a decided shortcoming in many applications such as underground electrical wires and cable wherein the insulated electrical unit is normally in contact with water, including saturating conditions.

SUMMARY OF THE INVENTION

This invention comprises the discovery that the inclusion of small quantities of lead stearate or dibasic lead stearate in polyolefin compositions comprising ethylene, stabilizes their dielectric strength when subjected to water or wet conditions.

The invention is specifically directed to, and particularly advantageous in overcoming the loss of dielectric strength under wet conditions in electrical insulating materials or compositions comprising a polymer containing ethylene.

OBJECTS OF THE INVENTION

A primary object of this invention is to provide a method of overcoming the loss of dielectric strength in polyolefin compositions containing ethylene due to the presence of water.

Also an object of this invention is to provide means of stabilizing the dielectric strength of polymeric compositions containing ethylene when subjected to wet conditions.

A further object of this invention is to provide dielectric polyolefin compositions containing ethylene having stabilized dielectric strength under wet conditions.

An additional object of this invention is to provide electrical conductors such as wire and cable insulated with dielectric polymeric compositions containing ethylene which maintain their dielectric strength when exposed to water.

BRIEF DESCRIPTION OF THE DRAWING

The drawing comprises a perspective view illustrating an insulated conductor of this invention.

DETAILED DESCRIPTION OF A PREFERRED EMBODIMENT

In accordance with the preferred embodiment of this invention, the dielectric strength of polyolefin compositions containing ethylene is effectively stabilized and maintained by adding thereto small amounts of lead stearate, or dibasic lead stearate, such as at least about 0.5 parts by weight of a lead stearate compound per 100 parts by weight of the polyolefin polymeric material. Effective proportions of lead stearate comprise about 0.5 to 10 parts thereof per 100 parts by weight of polymer, and preferably about 1 to 5 parts by weight thereof.

The polyolefin compositions stabilized by the means of this invention consist of polymers containing ethylene comprising polyethylene, copolymers of ethylene and other polymerizable materials, and blends of polymers or copolymers of ethylene with other polymeric materials as ethylene-vinyl acetate, and blends of polyethylene and ethylene-vinyl acetate. These comprise polymerized materials which are mainly ethylene in content, for example copolymers of ethylene-vinyl acetate containing at least about 70 up to about 95% by weight of ethylene.

The polymers containing ethylene comprising polyethylene, and blends or copolymers of ethylene, also may be combined with chlorine containing ingredients or polymers such as chlorinated polyethylene, chlorosulfonated polyethylene, or polyvinyl chloride, to provide flame resistance in the product.

The following examples demonstrate the effects of this invention as to the retention of dielectric strength with a typical commercial polymeric insulation composition comprising filled, cross-linked polyethylene when subjected to wet electrical conditions. The insulating composition formulations of the standard and of the examples of this invention are all given in parts by weight, and the standard and each composition of the examples were prepared and tested under identical conditions. All ingredients, other than the peroxide curing agent, were admixed and blended together in a Banbury two roll mill heated to about 230°F for a period of about 12 to 15 minutes. The peroxide curing agent was then added and blended in a Banbury by mixing for about 2 minutes at 210° to 220°F.

The compositions were each extruded on a 14 AWG wire conductor in a wall thickness of 3/64 of an inch insulation, and the polymer insulation cross-link cured by heating to a temperature of about 400°F in steam at approximately 250 p.s.i.g. for a period of about 1 minute.

The compositions comprising the standard and examples of this invention are as follows:

|  | EXAMPLES | | | Standard |
|---|---|---|---|---|
|  | 1 | 2 | 3 |  |
| Polyethylene | 100 | 100 | 100 | 100 |
| Clay | 50 | 50 | 50 | 50 |
| Vinyl trialkoxysilane | 1.5 | 1.5 | 1.5 | 1.5 |
| Titanium Dioxide | 5 | 5 | 5 | 5 |
| Antioxidant, polymerized trimethyl hydroquinoline (Flectol-H, Monsanto) | 1.75 | 1.75 | 1.75 | 1.75 |
| Dicumyl peroxide (Dicup-T, Hercules) | 3.55 | 3.55 | 3.55 | 3.55 |
| Dibasic lead stearate | (3) | (1.5) | — | — |
| Lead stearate | — | — | (1.5) | — |

The extent of the peroxide induced cross-link curing for the composition of each example and the standard was determined by the ASTM D-297 toluene extraction test, comprising ascertaining the soluble fraction of the cured polymeric material by treating a 2 gram sample of the cured insulating composition in boiling toluene for 16 hours. The relative soluble fractions of each cured composition comprised: Example 1 — 12.4; Example 2 — 12.0; Example 3 — 13.2; and, Standard — 10.8.

Samples of wire insulated with each exemplary formulation of this invention and the standard given above, were subjected to a series of identical tests for electrical properties to demonstrate the advantageous effects of the invention upon dielectric strength retention under adverse wet conditions, and also the absence of any significant debilitating effects resulting from the room temperature water for about one hour after which they were tested. Dielectric strength was measured using a quick rise test of 500 to 1000 volts per second rise until failure.

Insulation resistance (IR) was measured on 50 ft. length coils of the wire samples immersed in water at 75°C with 600 Volts AC 60 Hz stress on the conductor between measurements.

Specific inductive capacitance (SIC) and power factor were measured under the same conditions using 10 Volts at 1000 Hz bridge readings. IR was measured at 500 Volts DC stress.

The data derived from these tests for each composition of the invention and the standard were as follows:

TABLE I

DIELECTRIC STRENGTH RETENTION

| | | EXAMPLES 1 | 2 | 3 | Standard |
|---|---|---|---|---|---|
| Quick Rise (R.T. (Ave. 5 samples) | | | | | |
| VPM | Ave | 876 | 932 | 897 | 1050 |
| | Hi | 998 | 994 | 1046 | 1240 |
| | Lo | 607 | 824 | 758 | 970 |
| Conditioned | | | | | |
| 8 wk 75°C H₂O - 600 V AC | | | | | |
| Quick Rise at (R.T.) | | (% ret) | (% ret) | (% ret) | |
| VPM | Ave | 622 (71) | 797 (86) | 472 (53) | 660 (63) |
| | Hi | 730 | 911 | 625 | 720 |
| | Lo | 558 | 612 | 317 | 540 |
| 16 wks 75° H₂O - 600 V AC | | | | | |
| VPM | Ave | 719 (82) | 926 (99) | 940 (105) | 530 (50) |
| | Hi | 847 | 992 | 1083 | 615 |
| | Lo | 667 | 876 | 850 | 475 |
| 32 wks 75° H₂O - 600 V AC | | | | | |
| VPM | Ave | 833 (95) | 924 (89) | 921 (103) | 520 (50) |
| | Hi | 917 | 990 | 1094 | 700 |
| | Lo | 761 | 694 | 797 | 380 |
| 52 wks 75°C H₂O - 600 V AC | | | | | (70 wks) |
| VPM | Ave | 743 (85) | 839 (90) | 917 (102) | 590 (50) |
| | Hi | 841 | 925 | 930 | 790 |
| | Lo | 641 | 726 | 688 | 320 |

TABLE 2

SIC AND POWER FACTOR STABILITY

| | EXAMPLES 1 | | 2 | | 3 | | Standard | |
|---|---|---|---|---|---|---|---|---|
| Average 3 samples in 75°C H₂O 600 V AC on conductor 10V-1000 Hz readings | SIC | %PF | SIC | %PF | SIC | %PF | SIC | %PF |
| 1 Day | 2.60 | 1.29 | 2.58 | 1.07 | 2.66 | 1.16 | 2.63 | 1.03 |
| 1 Week | 2.60 | 1.06 | 2.59 | .95 | 2.67 | .98 | 2.64 | .67 |
| 2 Weeks | 2.61 | .97 | 2.59 | .81 | 2.67 | .95 | 2.65 | .68 |
| 4 Weeks | 2.61 | .90 | 2.45 | .78 | 2.57 | .85 | 2.65 | .67 |
| 8 Weeks | 2.61 | .73 | 2.60 | .66 | 2.68 | .79 | 2.66 | .65 |
| 12 Weeks | 2.63 | .60 | 2.62 | .63 | 2.69 | .61 | 2.66 | .65 |
| 14 Weeks | 2.62 | .57 | 2.61 | .56 | 2.68 | .62 | — | — |
| 16 Weeks | 2.61 | .56 | 2.60 | .58 | 2.72 | .55 | 2.67 | .62 |
| 18 Weeks | 2.61 | .61 | 2.60 | .56 | 2.66 | .60 | 2.66 | .60 |
| 22 Weeks | 2.63 | .51 | 2.47 | .50 | 2.58 | .54 | 2.67 | .57 |
| 26 Weeks | 2.62 | .61 | 2.61 | .58 | 2.67 | .51 | 2.67 | .60 | lead stearate upon other desired electrical properties of the polyolefin compositions.

Samples of the wire insulated with each formulation given were placed in water maintained at a temperature of 75°C with 600 Volts AC on the conductor and were subsequently tested at given intervals to determine dielectric strength retention, specific inductive capacitance (SIC), and power factor stability. The wire samples immersed in water at 75°C, were conditioned by applying a 600 Volt AC 60 Hz electrical stress across the insulation between the conductor and water. At the various time intervals given, samples of each formulation were removed, cut in 10 ft. sections and placed in

TABLE 3

ELECTRICAL STABILITY

| | EXAMPLES | | | |
|---|---|---|---|---|
| | 1 | 2 | 3 | Standard |
| 3 Samples Ave Insulation Resistance Megohms/1000' in 75°C H₂O - 600 V AC on Conductor | | | | |
| 1 Day | 5238 | 11309 | 4490 | 11584 |
| 1 Week | 5134 | 9375 | 4425 | 10030 |
| 2 Weeks | 4896 | 4249 | 4896 | 10304 |
| 4 Weeks | 4524 | 4229 | 1958 | 10476 |
| 8 Weeks | 5357 | 10268 | 5000 | 10084 |
| 12 Weeks | 5494 | 9028 | 4306 | 7642 |
| 14 Weeks | 5494 | 9375 | 2803 | — |
| 16 Weeks | 5655 | 10714 | 2654 | 6292 |
| 18 Weeks | 5637 | 6250 | 3209 | 8839 |
| 22 Weeks | 6250 | 9375 | 2708 | 7398 |

TABLE 3-continued

| | ELECTRICAL STABILITY EXAMPLES | | | |
|---|---|---|---|---|
| | 1 | 2 | 3 | Standard |
| 26 Weeks | 6146 | 10863 | 3346 | 6090 |

It is apparent from the foregoing data that the addition of minor amounts of a lead stearate compound pursuant to this invention provides a high degree of retention of dielectric strength. Moreover, no adverse effects upon the specific inductive capacitance or power factor were detected resulting from the lead stearate additions, and dibasic lead stearate was found to improve insulation resistance stability.

Insulated conductor products of this invention are illustrated in the drawing wherein an insulated wire 10 comprises a conductor 12 covered with a body of polymeric insulation 14 containing lead stearate and having a stabilized dielectric strength.

This invention includes filled polyolefin compositions as well as unfilled polyolefin compositions. Suitable fillers include clays or aluminum silicates, aluminum oxide, calcium silicates, magnesium silicates, magnesium oxide, titanium dioxide, particulate glass, and the like. Such fillers in conventional fine particle sizes may be included in the ethylene containing polymers in amounts up to about 200 parts by weight per 100 parts of the polymer content, and preferably in amounts of about 20 to 100 parts by weight thereof.

Fillers such as clays which are hygroscopic are preferably treated with a silicone material such as vinyl trialkoxysilane to avoid possible degrading of electrical and/or physical properties.

Curing agents comprise those materials which will effect cross-linking of the ethylene containing polymer, such as organic peroxides which decompose to provide free radicals upon exposure to increased temperatures. Tertiary organic peroxides such as di-α-cumyl peroxide are preferred because their temperature levels for decomposition and incitement of the cross-linking curing are in a practical range for most manufacturing operations. Suitable peroxide curing systems for ethylene containing polymeric materials are further described in U.S. Pat. Nos. 2,888,424; 3,079,370; 3,086,966; and 3,214,422. Specific tertiary diperoxides include 2,5 - dimethyl - 2,5 (t-butyl peroxy) hexane, and 2,5 -dimethyl - 2,5 - (t-butyl peroxy) hexyne - 3, and similar diperoxy compounds.

The ratio of peroxide curing agent to the ethylene containing polymeric material depends primarily upon the physical and chemical properties desired in the cured product such as the degree of solvent resistance or hot tensile strength. Amounts of peroxide curing agent of from about 0.5 to 10 parts by weight per 100 parts of the polymeric material satisfy most requirements, and typically proportions of about 2 to 5 parts by weight suffice for polymeric insulations for most electrical insulating service.

The compositions comprising a polymer containing ethylene of this invention may include other ingredients or additives depending upon their intended use and requirements therefor. For example, antioxidants are generally included such as polymerized trimethyl hydroquinoline, coloring pigments such as titanium dioxide or carbon. Other conventional compounding ingredients which may be included comprise preservatives, processing aids such as lubricants or mold releasing agents, pigments, etc.

In the following claims the term lead stearate is used to define dibasic lead stearate as well as lead stearate.

Although the invention has been described with reference to a certain specific embodiment thereof, numerous modifications are possible and it is desired to cover all modifications falling within the spirit and scope of the invention.

What I claim as new and desire to secure by the Letters Patent of the United States is:

1. A method of stabilizing the dielectric strength of polyolefin compositions under wet conditions, comprising dispersing through a polyolefin of at least one polymer composition containing ethylene selected from the group consisting of polyethylene and copolymers of ethylene and other halogen free polymerizable materials, at least about 0.5 parts by weight of lead stearate per 100 parts by weight of the polymer containing ethylene.

2. The method of stabilizing polyolefin compositions of claim 1, wherein the lead stearate is dispersed through the polymeric composition containing ethylene in amount of about 1 to 10 parts by weight per 100 parts of the polymer containing ethylene.

3. The method of stabilizing polyolefinic compositions of claim 2, wherein the lead stearate is dispersed through the polymeric composition containing ethylene in amount of about 1.5 to 5 parts by weight per 100 parts of the polymer containing ethylene.

4. A method of stabilizing the dielectric strength of polymeric compositions containing at least about 70 percent by weight of ethylene under wet conditions, comprising dispersing through a composition of at least one polymer containing at least about 70 percent by weight of ethylene selected from the group consisting of polyethylene, copolymers of ethylene and other halogen free copolymerizable monomers, and blends of polyethylene and other halogen free polymers about 1 to 5 parts by weight of lead stearate per 100 parts by weight of the polymer containing ethylene.

5. The method of stabilizing polymers containing ethylene of claim 4, wherein the lead stearate is dispersed through the polymeric composition containing at least about 70 percent by weight of ethylene in an amount of about 1.5 to 3 parts by weight per 100 parts of the polymer containing ethylene.

6. A method of stabilizing the dielectric strength of polyethylene under wet conditions, comprising dispersing through the polyethylene about 1 to 10 parts by weight of lead stearate per 100 parts by weight of the polyethylene.

7. The method of stabilizing polyethylene of claim 6, wherein the lead stearate is dispersed through the polyethylene in an amount of about 1.5 to 5 parts by weight per 100 parts by weight of the polyethylene.

8. A dielectric polyolefin composition having a stabilized dielectric strength under wet conditions, consisting of a polyolefin of at least one polymeric composition containing ethylene selected from the group consisting of polyethylene and copolymers of ethylene and other halogen free polymerizable materials, having dispersed therein at least about 0.5 parts by weight of lead stearate per 100 parts by weight of the polymer containing ethylene.

9. The stabilized dielectric polyolefin composition of claim 8, wherein the lead stearate is dispersed in the polymeric composition containing ethylene in an amount of about 1 to 10 parts by weight per 100 parts by weight of the polymer containing ethylene.

10. The stabilized dielectric polyolefin composition of claim 9, wherein the lead stearate is dispersed in the polymeric composition containing ethylene in an amount of about 1.5 to 5 parts by weight per 100 parts by weight of the polymer containing ethylene.

11. A dielectric polymer containing at least about 70 percent by weight of ethylene having a stabilized dielectric strength under wet conditions, consisting of a composition of at least one polymer containing at least about 70 percent by weight of ethylene selected from the group consisting of polyethylene, copolymers of ethylene and other halogen free copolymerizable monomers, and blends of polyethylene and other halogen free polymers, having dispersed therein about 1 to 10 parts by weight of lead stearate per 100 parts by weight of the polymer containing ethylene.

12. The stabilized dielectric polymer containing ethylene of claim 11, wherein the lead stearate is dispersed in the polymer containing at least about 70 percent by weight of ethylene in an amount of about 1.5 to 5 parts by weight per 100 parts by weight of the polymer containing ethylene.

13. A dielectric polyethylene having a stabilized dielectric strength under wet conditions, consisting of polyethylene having dispersed therein about 1 to 10 parts by weight of lead stearate per 100 parts by weight of the polyethylene.

14. The stabilized dielectric polyethylene of claim 13, wherein the lead stearate is dispersed through the polyethylene in an amount of about 1.5 to 5 parts by weight per 100 parts by weight of the polyethylene.

15. An electrical conductor with a polymeric insulation having a stabilized dielectric strength under wet conditions, comprising a metal conductor insulated with a polyolefin of at least one polymer composition containing ethylene selected from the group consisting of polyethylene and copolymers of ethylene and other halogen free polymerizable materials, having dispersed therein at least about 0.5 parts by weight of lead stearate per 100 parts by weight of the polymer containing ethylene.

16. The conductor with stabilized insulation of claim 15, wherein the lead stearate is dispersed in the polymer containing ethylene in an amount of about 1 to 10 parts by weight per 100 parts by weight of the polymer containing ethylene.

17. The conductor with stabilized insulation of claim 16, wherein the lead stearate is dispersed in the polymer containing ethylene in an amount of about 1.5 to 5 parts by weight per 100 parts by weight of the polymer containing ethylene.

18. An electrical conductor with a polymeric insulation having a stabilized dielectric strength under wet conditions, comprising a metal conductor insulated with a composition of at least one polymer containing at least about 70 percent by weight of ethylene selected from the group consisting of polyethylene, copolymers of ethylene and other halogen free copolymerizable monomers, and blends of polyethylene and other halogen free polymers, having dispersed therein about 1 to 10 parts by weight of lead stearate per 100 parts by weight of the polymer containing ethylene.

19. The conductor with stabilized insulation of claim 18, wherein the lead stearate is dispersed in the composition comprising a polymer containing at least about 70 percent by weight of ethylene in an amount of about 1.5 to 5 parts by weight per 100 parts by weight of the polymer containing ethylene.

20. An electrical conductor with a polymeric insulation having a stabilized dielectric strength under wet conditions, comprising a metal conductor insulated with polyethylene having dispersed therein about 1 to 10 parts by weight of lead stearate per 100 parts by weight of the polyethylene.

21. The conductor with stabilized insulation of claim 20, wherein the lead stearate is dispersed through the polyethylene in an amount of about 1.5 to 5 parts by weight per 100 parts by weight of the polyethylene.

* * * * *